Patented Sept. 10, 1946

2,407,582

UNITED STATES PATENT OFFICE 2,407,582

RESILIENT INSULATING BAT

Frank J. Soday, Swarthmore, Pa., assignor to The United Gas Improvement Company, a corporation of Pennsylvania No Drawing. Application August 10, 1940, Serial No. 352,122

1 Claim. (Cl. 117—126)

The present invention relates to a novel mineral fiber product, and to the method of making the same, and more particularly it relates to a product comprising synthetic or artificial mineral fibers coated with an isoprene resin preferably applied in the form of an aqueous isoprene-resin emulsion.

While the present invention is applicable for the treatment of any mineral fiber, for example asbestos, it is of particular advantage in the treatment of synthetic or artificial mineral fibers, such as glass fibers; mineral, slag or rock wool; quartz and other siliceous fibers, where the problem of abrasion is encountered. Since difficulties, due to abrasion, are accentuated in the case of glass fibers, the invention will be described using glass fibers as illustrative of the various mineral fibrous materials which may be treated in accordance herewith.

It has been found that individual glass fibers initially produced possess excellent mechanical properties, but glass is not a stable material in the solid state, as it is in reality a super-cooled liquid; consequently, any abrasion suffered by the glass fibers results in a very marked decrease in their mechanical strength. For example, if one fiber is drawn across the surface of a second glass fiber, or comes in contact with another surface, such as a metal or ceramic surface, the surface of the fiber is abraded with the formation of minute microscopic surface cracks or pits. Since the glass fiber is under considerable internal strain, these cracks or abrasions locally weaken the external surface of the glass fibers sufficiently to permit such strains to be relieved destructively when the fiber is subsequently subjected to mechanical stresses, resulting in the fracture or disintegration of the fiber. Tests have indicated that the mechanical strength and resistance to distortion of typical glass fibers are reduced approximately 90% by abrasion, regardless of the size of the area abraded or the depth or extent of the abrasion.

This difficulty, due to abrasion, is a serious problem in products fabricated from glass fibers, such as woven, felted or other articles. Thus, glass fiber bats for insulating purposes are prepared by forming a loose mat or felt of the desired shape from glass fibers and these depend for their insulating efficiency on the formation of dead air spaces or pockets within the interior of the bat by the meshed fibers of which it is constructed. Since air is an excellent insulating medium, such bats possess very good insulating properties. However, it has been found that bats of this type suffer a serious loss of insulating efficiency during storage, shipment, and installation, as they are readily crushed, resulting in a marked decrease in the number and size of the air spaces or pockets present in a given unit. The same difficulties are present in insulating bats made from mineral, slag, and/or rock wool, and in woven fabrics made of synthetic mineral fibers; the destruction of the usefulness of the fabric due to abrasion, is also encountered.

A principal object of the present invention is to provide mineral fibers coated by an aqueous isoprene-resin emulsion, so that the fibers become encased in a sheath of isoprene resin, thereby effectively protecting the fibers from abrasion.

A further object of the invention is to provide synthetic mineral fibers and products fabricated therefrom which will withstand storage, shipment, installation and use without substantial loss of strength or of the other desirable properties of the glass fibers.

Still another object of the present invention is to furnish synthetic mineral fiber bats for insulating purposes which possess unusual resiliency, due to the elastic nature of the coating of the fibers, which coating further tends to protect the material from deterioration due to external mechanical stresses, and enables the mass to regain its original shape upon distortion.

Another object of the invention is to provide from mineral fibers textile and other woven or formed articles which are sufficiently impregnated by an isoprene-resin emulsion to form products in which the fabric is enclosed in a continuous isoprene-resin coating; said products being available for many uses, for example, where a product having the strength of the mineral fibers, and which is impervious to the passage of gases or liquids, is desired.

Other objects, including the provision of a novel and economical method of preparing the products hereinbefore described, will be apparent from a consideration of the specification and claim.

Individual mineral fibers may be treated with an aqueous isoprene-resin emulsion in accordance with the present invention and thereafter formed into any desired fabricated product; or products, such as woven, felted, or other formed articles fabricated from mineral fibers may be treated with the emulsion. Herein, where the term "mineral fiber" or "synthetic mineral fiber" is used without qualification, it includes the fabricated product as well as the individual fibers, and the term "fabricated product" includes products made by weaving, felting, or otherwise manipulating the mineral fibers to form an article or product.

The aqueous isoprene-resin emulsions employed in the treatment of the mineral fibers, in accordance with the present invention, are described and claimed in copending application Serial Number 352,120, filed August 10, 1940, and the disclosure of that application is included herein by reference.

As pointed out in said copending application, the resinous polymers employed in the preparation of the emulsions may result from the polymerization of isoprene alone or in the presence of other unsaturated and/or reactive hydrocarbons, such resinous polymers being referred to herein as isoprene resins. Preferably, a soluble resin polymer is employed which is truly resinous in character, as distinguished from resins possessing rubber-like properties.

They differ from synthetic rubber in that they possess a definite and reproducible softening point, and are compatible with drying oils. In addition, they cannot be vulcanized by any of the methods usually employed for this purpose in the rubber industry.

The resinous polymers employed in the production of the aqueous emulsions used herein may have any desired softening point which may range all the way from relatively high temperatures down to relatively low temperatures. Accordingly, the particular isoprene resin employed may have a softening point above, below or at room temperature, although softening points of at least 60° C. are preferred.

Generally speaking, and as disclosed in the prior art, when the starting material is pure isoprene and when a metallic halide catalyst is employed, the resulting resinous polymer has a substantially elevated softening point, that is above 60° C.

The same is true when certain selected olefines are present as also disclosed in the prior art.

This does not hold true, however, in the case of olefines which normally occur in the presence of isoprene in hydrocarbon fractions resulting from the pyrolytic decomposition of petroleum oil such as takes place, for instance, in the manufacture of oil gas, carburetted water gas, or in the manufacture of motor fuels.

In such instances, and when employing previously known polymerization methods, the character of the olefines present, even though reduced to as low as 5% of the unsaturates present, is such as to result in the production of resinous polymers which are liquid at ordinary temperatures, or to a mixture of such liquid polymers and insoluble polymers.

I have discovered a new method for the production of resinous isoprene polymers from the foregoing hydrocarbon fractions which polymers have softening points substantially above room temperatures. This process is more particularly described and claimed in my copending application Serial Number 352,119, filed August 10, 1940, and comprises treating isoprene fractions derived from the sources indicated and boiling between approximately 30° C. to 40° C. with boron trifluoride as distinguished from all other catalysts of this type at temperatures below −20° C. and preferably below −30° C. Cyclopentadiene is preferably removed from such isoprene fractions prior to polymerization. Aromatic hydrocarbons, such as benzene, toluene, and xylene, may be added and may take part in the polymerization.

Isoprene resin emulsions made with isoprene resins resulting from the process of my last mentioned copending application are preferred herein.

Very satisfactory resins for use in the preparation of the emulsions may be obtained when isoprene is polymerized with certain selected olefines, particularly aliphatic olefines, or when isoprene is polymerized in the presence of benzene, toluene, xylene, or high boiling aromatic hydrocarbons either with or without the addition of olefine hydrocarbons, using a metallic halide such as aluminum chloride as a catalyst. When aromatic hydrocarbons are present during polymerization, the quantity which takes part and becomes a part of the resin usually is less than 5% of the resin, the rest, if any, acting for the most part as diluent.

Other diolefines, in addition to the isoprene, such as butadiene and piperylene, may be present if desired, in which event, the isoprene preferably comprises at least the major portion of the diolefine content, and usually preferably comprises 90% or more of the total diolefines present; but satisfactory resins have been obtained using a mixture of diolefines where the isoprene content was 75% or less, based on the total diolefine content.

In general, when forming the resins, the unsaturated hydrocarbons as distinguished from aromatics usually comprise from 10% to 80% by weight of the total material present, the ratio of isoprene to other unsaturated hydrocarbons being from 40% to 100% by weight.

The polymerization is advantageously carried out in the presence of a halide-containing catalyst, such as a metallic halide, metallic halide-organic solvent complex, ansolvo acid, and the like, the quantity of catalyst usually ranging from 0.1% to 5.0% by weight of the total unsaturated and reactive compounds present.

The temperature may advantageously range from −60° C. to +60° C., and the time of reaction may vary from one to ten hours.

Although I have particularly set forth convenient and preferred methods of forming the isoprene resin to be used in making up the isoprene resin emulsions employed herein, particularly when other unsaturated and/or reactive hydrocarbons are present with the isoprene during the polymerization, it is to be understood that broadly speaking the isoprene resin may be derived from any source particularly if its softening point is above atmospheric temperatures and especially when its softening point is above 60° C.

The resinous emulsion employed in accordance with the present invention is a resin-in-water emulsion.

In the preparation of an aqueous isoprene-resin emulsion, a mixture of water and resin is violently agitated with a view of maintaining one phase in a state of minute subdivision, the other phase coalescing to form the continuous phase. As the stability of the emulsion finally obtained is directly proportional to the degree of subdivision of the dispersed phase, it is apparent that efficient agitation should preferably be employed in order to insure the desired fineness of the dispersed phase.

Any suitable agitating or stirring device may be employed in forming the emulsion, and very satisfactory emulsions have been obtained by the use of the so-called colloid mills.

The emulsion may be formed by a dry process, a wet process, or a combination of the two, as described in my first mentioned copending application.

In the dry process, the resin is reduced to a powder of the desired degree of fineness, after which it is emulsified by any suitable method and, for instance, at room temperature. In general, this type of emulsification requires the use of a very efficient stirring or agitating device in order to insure the production of an emulsion possessing the desired stability.

In the wet process, on the other hand, the resin is fused prior to or during the emulsification process, the mixture to be emulsified usually being maintained above the melting point of the particular resin employed during at least the major portion of the process. It is apparent that this method is especially suited to the preparation of emulsions at atmospheric pressures from resins having a melting or softening point below 100° C., that is, below the boiling point of water. However, by conducting the emulsification in a closed system, thus permitting the water employed to be maintained at any desired elevated temperature, without undue volatilization, isoprene resins possessing any desired softening point may be employed.

An alternative method for forming the emulsion comprises the addition of sufficient solvent to a high softening point isoprene resin to lower its melting point sufficiently to permit it to be fused at a temperature below 100° C. The added solvent may then be removed from the finished product, if desired, by steam distillation, or by other suitable methods.

In a combination of the two types of processes, the resin may be powdered and partially emulsified by means of the dry process, after which the emulsification may be completed by means of the wet process.

In general, isoprene-resin emulsions prepared by the wet process, or by a combination of the dry and wet processes, have a tendency to be more stable than those prepared by the dry process alone.

In order to form the emulsion, a suitable emulsifying agent is associated with the water and the isoprene resin to be emulsified. Emulsifying agents may be divided into three classes, namely, chemical, colloidal and solid.

Referring now to chemical emulsifying agents the majority of those which may be used for the emulsification of isoprene resins are of the polar type, one end of the molecule being hydrophilic (water attractive) and the other end being lipophilic (oil attractive) or hydrophobic (water repelling). The lipophilic portion of the molecule frequently consists of an aliphatic or aromatic chain or ring, or combination thereof, while the hydrophilic part frequently consists of one or more polar groups, such as $-SO_3H$, $-SO_3Na$, $-COOH$, $-COOK$, $-COONH_4$, $-CONH_2$, $-CONHR$, in which R represents an alkyl, aryl, or alkyl-aryl group, and the like.

In general, therefore, the chemical emulsifying agents may be represented by the general formula $$A_nB_n$$

where A represents an alkyl, aryl, or aralkyl chain, B represents a polar group which may be organic, inorganic, or organic-inorganic in nature, and $n$ represents any integer, usually from 1 to 3. However, it is not represented that all compounds satisfying this formula are emulsifying agents.

When emulsifying agents of this type are added to an isoprene resin-water mixture, and the whole is violently agitated by any suitable means, the emulsifying agent is adsorbed at the interface and orients itself so that the lipophilic part is in the oil phase and the hydrophilic part is in the water phase. The relative activity and mass of the respective hydrophilic and lipophilic portions of the emulsifying agent used determines, in large measure, the tendency to form resin-in-water or water-in-resin type emulsions.

This is well illustrated by a consideration of the emulsifying action of salts of the higher fatty acids, such as palmitic, oleic, and stearic, upon a mixture of isoprene resin and water. The ammonium, potassium, sodium and other monovalent salts of these acids have a pronounced hydrophilic character and thus act as emulsifying agents to form resin-in-water emulsions, and the use thereof is to be preferred over the salts of the di- and tri-valent metals which tend to form water-in-resin emulsions.

In addition to the salts of the fatty acids previously mentioned, the salts of other members of this class, such as margaric, linoleic, and linolenic acids, also may be used with good results. Fatty acids derived from drying oils, such as linseed, tung, and Perilla, in the form of salts also are excellent emulsifying agents, as well as the salts of naturally occurring acids, such as rosin acid (abietic acid). In general, it may be said that the salts of the higher molecular weight fatty acids, particularly those containing more than eight carbon atoms, make excellent emulsifying agents for the preparation of isoprene-resin emulsions. Examples of particularly good emulsifying agents of this class include sodium oleate, ammonium laurate, ammonium stearate, potassium oleate, sodium laurate, potassium laurate, sodium stearate, and potassium stearate.

In addition to the use of the metallic derivatives of the fatty acids as emulsifying agents for this purpose, it has been found that other salts, such as the ammonium derivatives and the compounds formed by reacting basic organic ammonium compounds such as mono-, di-, or triethanolamine with the fatty acids, as well as other derivatives, such as the amides and amino derivatives, are eminently suited also. The amine salts or esters of fatty acids of the type described, such as amino-stearin, are included within this class. All of the foregoing emulsifying agents are designated herein as "the salts of relatively high molecular weight organic acids."

Another class of active emulsifying agents comprises the sulfonic acid derivatives of hydrocarbons, such as alkyl sulfonic acids, as well as other compounds containing the sulfate or sulfonate group. Salts of these compounds, such as the sodium, potassium or ammonium salts, as well as the salts derived by reacting these compounds with organic bases, are particularly effective. Examples of such compounds are Turkey red oil (the sodium, potassium, or ammonium salt of the product obtained by treating castor oil with sulfuric acid), sodium lauryl sulfate, the sodium salts of the sulfonated alkyl naphthalenes, the sodium salts of sulfonated alkyl benzenes, toluenes, or xylenes, and the dioctyl ester of sodium sulphosuccinate.

Water-soluble sulfuric acid esters of relatively high molecular weight aliphatic alcohols, as well as certain derivatives and salts thereof, for example, the alkali metal and ammonium salts, such as sodium lauryl sulfonate, are excellent emulsifying agents for this type of emulsion also.

The foregoing compounds of sulfated or sulfonated hydrocarbons, and derivatives thereof are designated herein as "sulfonated hydrocarbon derivatives."

If desired, the emulsifying agents may be formed in situ. Thus, the lipophilic compound, for example, a fatty acid, such as oleic acid, may be dissolved in the resin and the compound forming the hydrophilic group, for example, the desired alkali, such as sodium hydroxide, may be dissolved in the water phase. Combining the two phases, results in the formation of the desired emulsifying agent, in this case sodium oleate. As the formation of the emulsifying agent takes place at the interface, the high concentration of this material at the time of formation, and at the location where it can exert its optimum effect, very materially assists in the preparation of stable emulsions.

Particularly stable aqueous isoprene-resin emulsions which are relatively insensitive to changes in temperature may be prepared by the use of emulsifying agents comprising compounds prepared from the relatively high molecular weight decomposition products of albumen in combination with relatively high molecular weight saturated or unsaturated fatty acids, or their derivatives or substitution products. An example of these materials is the oleic-acid amino-compound of the decomposition products of albumen.

The use of esters of polyvalent alcohols and saturated or unsaturated relatively high molecular weight fatty acids, such esters still containing non-esterified alcoholic OH groups, in combination with the foregoing emulsifying agents further serves to stabilize the emulsions prepared therewith, particularly with reference to decreasing their tendency to flocculate upon the addition of hard water, that is, water containing calcium or magnesium sulfates. Examples of such agents are glycerol mono-stearate, propylene glycol mono fatty acid ester, and the glycerol mono- and diesters of cocoanut oil fatty acids. The acid constituent may consist, for example, of halogen, oxy, or amino compounds of saturated or unsaturated fatty acids, while the alcoholic constituent may consist of polyvalent alcohols or their derivatives.

In certain cases, also, it may be found to be desirable to use two or more of the foregoing emulsifying agents for the preparation of isoprene-resin emulsions in order to impart certain desirable characteristics to the resulting product.

Referring now to the colloidal emulsifying agents those which may be used for the preparation of isoprene-resin emulsions include proteins, carbohydrates, and albuminous materials of high molecular weight. Examples of such compounds are egg albumen, glue, casein, starch and gelatine. Although these molecules possess some polar characteristics, the major portion of their emulsifying action undoubtedly is due to the adsorption of a thin film of the emulsifying agent at the interface, thus forming a protective membrane which retards the coalescence of the globules of the dispersed phase.

An additional factor which materially assists in the stabilization of the resin-in-water emulsions is the large increase in the viscosity of the dispersion medium caused by the addition of even relatively small portions of emulsifying agents of this type. This assists in retarding the Brownian movement which normally tends to slowly coalesce the individual globules of the dispersed phase.

Referring now to solid emulsifying agents it has been previously pointed out that certain finely divided solids can be used as emulsifying agents for the preparation of aqueous isoprene-resin emulsions. These materials exert their influence by distributing themselves at the interface. As the stabilization of the emulsion depends upon both phases wetting the solid surface, it is evident that the stabiilty of the resulting emulsion is directly dependent upon the particle size of the desired emulsifying agent, as well as upon the amount of emulsifying agent employed. Examples of solid emulsifying agents which may be used for the preparation of aqueous isoprene-resin emulsions are finely divided ferric hydroxide, finely divided arsenious sulfide, and finely ground silica. Siliceous materials in general, such as clay, kieselguhr, bentonite, and the like, also may be employed for this purpose.

It is, of course, to be understood that any combination of the foregoing classes of emulsifying agents, namely, chemical, colloidal, and solid may be employed to prepare isoprene-resin emulsions having desirable physical properties.

The use of a wetting agent or detergent, such as the sodium salt of isopropyl naphthalene sulfonic acid with the emulsifying agents previously described gives particularly satisfactory results.

The use of emulsifying agents and procedures of the foregoing character will in by far the larger number of cases result in the desired resin-in-water emulsions to the use of which in the coating of inorganic materials this invention more particularly relates.

The quantities of ingredients employed in preparing the emulsions to be used in accordance with this invention, namely, isoprene resin, emulsifying agent or agents and water may be varied over very wide limits. In general, this will depend somewhat upon the adopted procedure of coating or impregnating the particular mineral fibers and upon the amount of resin which it is desired to associate with the mineral fibers. In general, however, it has been found that the approximate practical upper limit for the concentration of isoprene resin in the finished emulsion is aproximately 60% by weight. The lower limit of the isoprene resin in the emulsion may be as low as desired, for example, 1% or 2% by weight.

The quantity of emulsifying agent rarely exceeds 20% by weight of the resin employed; and in most cases, it will be found that 5% to 10% of the emulsifying agent is ample.

As pointed out in my first mentioned copending application, the emulsions can be further stabilized by the addition of materials which increase the viscosity of either of the phases, examples of such materials being sugars, albuminous materials, glues, gelatine, casein, and derivatives of resinous materials, such as the sodium salt of polymerized methacrylic acid or partially saponified polymerized methyl methacrylate.

Among the various additives that may be incorporated in my isoprene resin emulsions, if desired, are the following: (1) other synthetic resins, such as resins prepared by the polymerization of other unsaturated hydrocarbons, vinyl chloride, vinyl acetate, acrylic acid and derivatives of acrylic acid, methacrylic acid, and derivatives of methacrylic acid, vinylidene compounds, unsaturated aldehydes, unsaturated ketones, as well as resins derived by the co-polymerization of mixtures containing one or more of the foregoing; (2) derivatives of the foregoing resins, such as the sodium salt of polymerized methacrylic or acrylic acids; (3) natural resins, such as rosin, shellac, Congo, dammar, kauri, elemi, pontianak, and chicle; (4) plasticizing agents, such as esters of phthalic acid, phosphoric acid esters, chlorinated diphenyl, and the like; (5) pigments; (6) fillers, such as wood flour, fabric waste, cotton linters, and the like; (7) coloring agents, such as dyes, lakes, and the like; (8) decorative pigments, such as chitin extracts, mercurous chloride flakes, pearl essence, and the like; (9) asphalts and pitches; (10) waxes; (11) drying oils, either raw or bodied; (12) solvents; (13) cellulosic plastics such as cellulose nitrate and acetate and the cellulose ethers and (14) miscellaneous materials, such as gelatine, casein, glue, gum arabic, and the like.

It will be understood, of course, that any desired combination of the foregoing types of additives may be employed, if desired. In certain cases, the added materials may take the place of the emulsifying agents normally employed, either wholly or in part.

In addition, the isoprene-resin emulsions may be further modified for specific purposes by blending with a second emulsion, such as synthetic or natural rubber latices, or another isoprene-resin emulsion.

As previously pointed out, difficulties have been encountered due to the very marked decrease in the mechanical properties of synthetic mineral fibers caused by the abrasion thereof.

In accordance with the present invention, such damage may be prevented by applying a coating of isoprene resin in the form of an aqueous isoprene-resin emulsion on the surface of the fibers, followed by the removal of water and other volatile components by a suitable means such as heating.

The emulsion may contain other ingredients, as hereinbefore pointed out, although excellent results have been secured by the use of aqueous isoprene-resin emulsions without the addition of any other ingredients.

The fibers, either as individual fibers or in fabricated form, may be coated with the aqueous isoprene-resin emulsion in any desired manner, for example, by spraying, dipping or flowing the aqueous isoprene-resin emulsion upon the individual fibers or upon the finished bats, threads, fabrics, and the like.

The invention is of particular applicability in the treatment of glass fiber or mineral, rock or slag wool bats for insulating purposes. As previously stated, these bats are prepared by forming a loose bat or felt of the desired shape from the fibers, and such bats depend for their insulating efficiency on the formation of dead air spaces or pockets within the interior of the bat by the meshed fibers of which it is constructed. Due to the large number of air spaces, and since air is an excellent insulating medium, the bats possess good insulating properties.

However, in storage, shipment and installation, the bats ordinarily are easily crushed, resulting in a marked decrease in the number and size of the air spaces or pockets present in a given unit, and hence the product suffers a serious loss of insulating efficiency.

Such damage can be prevented by applying a coating of isoprene resin to the fibers in the form of an aqueous isoprene-resin emulsion, followed by the removal of the volatile constituents present by any suitable means. As a result, the fibers are completely enclosed in a sheath of isoprene resin, effectively protecting the fibers from abrasion.

In addition to the protection against abrasion, it has been found that insulating bats prepared from such coated fibers possess unusual resiliency, due among other things to the elastic nature of the coating which further tends to protect the material from deterioration, due to external mechanical stresses, and enables the mass to regain its original shape upon distortion.

As an example of the preparation of insulating bats, the fibers after being spun from a molten bath may be transferred to a suitable conveyor and matted or felted into the desired form by means of a stream of air, steam, or other gas. During this stage of the process, the fibers may be coated with an isoprene-resin emulsion by introducing the emulsion into the unit along with the stream of steam, air or other gas. The wet, coated fibers may then be passed through a furnace, or other device, or zone during which the volatile constituents are removed. As a result, the individual mineral fibers are coated with a layer of isoprene resin which effectively protects the fibers from mechanical injury.

Mineral fibers which are to be used for other purposes, such as for the preparation of threads, fabrics, mats or other form of article, may be coated in a similar manner or otherwise.

Textiles and other woven or formed articles prepared from mineral fibers may, if desired, be completely impregnated by means of an aqueous isoprene-resin emulsion, resulting in articles in which the fabric is enclosed in a continuous isoprene-resin coating. Such a product finds numerous uses in industry, for example, where it is desired to obtain a fabric which is impervious to the passage of gaseous or liquid products.

The quantity of resin applied can be varied over fairly wide limits in order to obtain any desired physical properties in the finished material.

After treating the inorganic material with the desired isoprene resin emulsion the volatile materials may be removed in any desired manner such as by the application of heat, or otherwise. Suitable methods for the application of heat comprise the use of ovens in which the treated material may be placed, or through which it may be passed continuously or otherwise, as well as the use of infra red rays for this purpose.

An alternative method for removing the water comprises the addition of a coagulating agent, such as methyl alcohol, barium chloride, alum, ethyl alcohol, or acetone, which serves to flocculate the emulsion and deposit the isoprene resin directly upon the surface of the material.

While any desired emulsifying agent may be used in the preparation of the isoprene-resin emulsion, and any means for coagulating the dispersed resin of the emulsion may be employed, a suitable choice of emulsifying agent or coagulating means, or both, will have a considerable influence upon the physical appearance and properties of the finished product. For example, when ammonium salts such as ammonium caseinate or ammonium oleate are employed as emulsifying agents, the subsequent heat treatment serves to remove the volatile constituent ammonia, leaving the residue from the emulsifying agent firmly adhering to the material.

Similarly when alkali metal or ammonium salts, such as sodium caseinate, sodium oleate, or ammonium laurate, are employed as emulsifying agents, the use of a heavy metal salt, for example, barium chloride, as coagulant, results in the deposition of the corresponding heavy metal salt of the acidic portion of the emulsifying agent upon the surface of the material.

Sizing, such as a rosin size, may be incorporated with the aqueous isoprene-resin emulsion prior to its application to the material, if desired, or it may be applied to the material separately in which case it is preferably applied prior to the application of the isoprene resin emulsion. The proportion of isoprene resin and sizing or filling materials may be varied at will in order to produce a final sheet or other product having the desired physical properties.

As pointed out previously, the isoprene resin may be precipitated on the desired surface by any suitable means such as by the application of heat which serves to remove the water and other volatile material, or by the addition of suitable coagulating agents. An extension of this latter means involves the addition of milk to an aqueous isoprene-resin emulsion as a coagulating agent, particularly in those cases in which an emulsifying agent capable of being decomposed by acids naturally formed in the milk, such as rosin soap, ordinary soaps, saponified waxes, and similar materials, has been employed. Milk is an aqueous dispersion of fat, which slowly decomposes with the formation of acidic substances. In consequence of the very slow formation of acid, a gradual flocculation of the isoprene resin takes place. This is particularly desirable in certain cases, such as those in which a uniform deposition of very fine resin particles over the surface to be covered is desired.

The type of film obtained, when the aqueous isoprene-resin emulsion is applied to the mineral fiber, which term includes the fabricated product, and the aqueous vehicle evaporated or otherwise removed, depends on the temperature to which the treated material is exposed, either after or during the evaporation or other removal of the vehicle. In the event the water is removed at a temperature below the softening point of the resin, the mineral fiber will be covered by a film of the resin comprising discrete particles. Such a covering is advantageous for many purposes, since it is relatively pervious.

The film comprising the discrete particles may be subsequently converted, if desired, into a continuous impervious film by heating the treated material above the softening point of the resin sufficient to cause the discrete particles to flow and weld together. Such a temperature may be furnished by an oven or drier, or by a heated roll, or a calender.

A similar continuous film of resin is also obtained when the aqueous vehicle is removed from the treated material at a temperature above the softening point of the resin.

The process is further illustrated by means of the following examples:

Example 1

A quantity of loose glass fibers was coated with an isoprene-resin emulsion containing approximately 50% of isoprene resin, after which they were heated for a period of 10 minutes at a temperature of 200° C. After cooling, the individual glass fibers were found to be coated with a continuous layer of isoprene resin, effectually protecting the fibers from exterior mechanical abrasion.

The coated fibers were subsequently shaped to form an insulating bat, which was relatively very resilient and resistant to deformation.

Example 2

A glass fiber insulating bat was dipped into an aqueous isoprene-resin emulsion containing 20% isoprene resin, after which the coated bat was permitted to drain for a period of 15 minutes and then heated for a period of 10 minutes at a temperature of 200° C. Upon cooling, the individual fibers were found to be covered with a protective coating of isoprene resin, and certain of the fibers were cemented together at those points at which they came in contact with each other. The insulating bat was relatively very resilient and resisted deformation strongly.

Example 3

A piece of a woven glass fiber fabric was sprayed with an aqueous isoprene-resin emulsion containing 20% isoprene resin, after which it was heated to a temperature of 200° C. for a period of 10 minutes. Upon cooling, the fabric was found to be evenly coated with a layer of isoprene resin.

Example 4

A piece of loosely woven glass fiber fabric was dipped in an isoprene-resin emulsion containing 50% isoprene resin, after which it was baked for a period of 15 minutes at a temperature of 150° C. A coated fabric in which the interstices were filled with isoprene resin was obtained.

In the claim the term "compatible with drying oils" is employed merely to describe characteristics of the isoprene resin, and is not intended to mean that a drying oil or drying oils are necessarily present.

Considerable modification is possible in the selection of the isoprene-resin emulsion employed, as well as in the methods of applying the same to the mineral fibers, without departing from the essential features of the invention.

I claim:

A resilient insulating bat comprising felted synthetic mineral fibers having applied thereto a coating comprising an isoprene resin, said isoprene resin being a product of the catalytic polymerization in the presence of boron trifluoride and under temperature conditions at least as low as $-20°$ C. of an isoprene light oil fraction obtained in the pyrolysis of petroleum oil and containing other unsaturated hydrocarbon material, said fraction boiling between 30° and 40° C. and having an isoprene content constituting at least 90% by weight of the total diolefine content thereof and at least 40% by weight of the total unsaturation thereof, said isoprene resin being compatible with drying oil and having a definite and reproducible softening point at least as high as 60° C.

FRANK J. SODAY.